US009911262B2

(12) United States Patent
Tschache

(10) Patent No.: US 9,911,262 B2
(45) Date of Patent: Mar. 6, 2018

(54) DISTANCE DETERMINATION AND AUTHENTICATION OF A REMOTE CONTROL KEY TO A VEHICLE

(71) Applicant: VOLKSWAGEN AG, Wolfsburg (DE)

(72) Inventor: Alexander Tschache, Wolfsburg (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/088,883

(22) Filed: Apr. 1, 2016

(65) Prior Publication Data

US 2016/0292940 A1 Oct. 6, 2016

(30) Foreign Application Priority Data

Apr. 2, 2015 (DE) ........................ 10 2015 206 009

(51) Int. Cl.

| | |
|---|---|
| ***G05B 19/00*** | (2006.01) |
| ***G06F 7/00*** | (2006.01) |
| ***G08B 29/00*** | (2006.01) |
| ***H01B 1/00*** | (2006.01) |
| ***H04Q 9/00*** | (2006.01) |
| ***G08C 19/00*** | (2006.01) |
| ***G07C 9/00*** | (2006.01) |

(52) U.S. Cl.

CPC ..... *G07C 9/00309* (2013.01); *G07C 2209/63* (2013.01)

(58) Field of Classification Search

CPC ........... G05B 19/00; G06F 7/00; G08B 29/00; H04B 1/00; H04Q 9/00; G06C 17/02; G07C 9/00309

USPC ............ 340/5.61, 5.64, 426, 428; 455/151.2, 455/34.3; 701/1, 36

See application file for complete search history.

(56) References Cited

U.S. PATENT DOCUMENTS 5,369,706 A * 11/1994 Latka ................ G07C 9/00182 340/11.1
5,774,065 A * 6/1998 Mabuchi ........... G07C 9/00182 307/10.2
6,130,622 A * 10/2000 Hussey .................. B60R 25/24 235/382
6,484,260 B1 * 11/2002 Scott ...................... G06F 21/32 713/182
6,617,961 B1 * 9/2003 Janssen ................ B60R 25/245 307/10.1
6,658,328 B1 * 12/2003 Alrabady ........... G07C 9/00309 307/10.2
6,803,851 B1 * 10/2004 Kramer .................. B60R 25/24 340/12.51

(Continued)

FOREIGN PATENT DOCUMENTS

DE 4409167 C1 6/1995
DE 10064141 A1 7/2002

(Continued)

*Primary Examiner* — Nam V Nguyen

(74) *Attorney, Agent, or Firm* — Barnes & Thornburg LLP

(57) ABSTRACT

A method for authenticating a radio key for a vehicle involving determining a distance between the radio key and the vehicle and authenticating the radio key. A character string generated by the radio key is transmitted to the vehicle to determine the distance. The character string is generated independently of an item of information transmitted by the vehicle, and the authentication is based on the character string.

16 Claims, 2 Drawing Sheets

(56) References Cited

U.S. PATENT DOCUMENTS

| | | | | |
|---|---|---|---|---|
| 6,819,229 | B2 * | 11/2004 | Ghabra | B60R 25/24 307/10.3 |
| 6,946,950 | B1 * | 9/2005 | Ueno | G06K 7/0008 340/10.1 |
| 7,034,654 | B2 * | 4/2006 | Forest | B60R 25/04 307/10.7 |
| 7,245,252 | B2 * | 7/2007 | Knepper | G07C 9/00309 342/118 |
| 8,368,516 | B2 * | 2/2013 | Fischer | H04L 9/3226 340/10.1 |
| 9,007,195 | B2 * | 4/2015 | Ghabra | B60R 25/246 340/426.16 |
| 9,082,241 | B2 * | 7/2015 | Leong | B60R 25/24 |
| 9,214,083 | B2 * | 12/2015 | Lim | G08C 17/02 |
| 2006/0077037 | A1 * | 4/2006 | Luo | B60R 25/24 340/5.72 |
| 2007/0085656 | A1 * | 4/2007 | Tang | B60R 25/24 340/5.64 |
| 2007/0182582 | A1 * | 8/2007 | Booher | G07C 9/00309 340/12.22 |

FOREIGN PATENT DOCUMENTS

| | | | |
|---|---|---|---|
| DE | 10114876 | A1 | 10/2002 |
| DE | 10158200 | A1 | 6/2003 |
| DE | 10158202 | A1 | 6/2003 |
| DE | 10212648 | A1 | 10/2003 |
| DE | 102004036920 | A1 | 3/2005 |
| DE | 102005021377 | A1 | 11/2006 |
| DE | 102007004063 | A1 | 7/2008 |
| DE | 102009018602 | A1 | 11/2009 |
| EP | 1182313 | A1 | 2/2002 |
| WO | 02054353 | A1 | 7/2002 |

* cited by examiner

DISTANCE DETERMINATION AND AUTHENTICATION OF A REMOTE CONTROL KEY TO A VEHICLE

PRIORITY CLAIM

This patent application claims priority to German Patent Application No. 10 2015 206 009.8, filed 2 Apr. 2015, the disclosure of which is incorporated herein by reference in its entirety.

SUMMARY

Illustrative embodiments relate to a method and an apparatus for simultaneously determining the distance between a radio key and a vehicle, on the one hand, and for authenticating the radio key, on the other hand.

BACKGROUND

To prevent so-called relay station attacks (extension of the radio path from the vehicle to the vehicle key), it is a known practice to determine the distance between the vehicle key and the vehicle. The following problems now arise during this distance determination:

If the distance is determined using unencrypted radio signals, the distance measurement may be corrupted by a potential attacker. As a result, the previously mentioned relay station attacks become possible again by virtue of an attacker falsifying the distance measurement to be able to subsequently authenticate the vehicle key using the relay station attack.

If the distance is determined using encrypted radio signals, the distance cannot be determined accurately enough. This is due to the fact that the encryption of the signal sent back influences the response time (that is to say the period of time between the transmission of a radio signal to the radio key and the reception of the encrypted radio signal sent back from the radio key), on account of the period of time needed for the encryption, in such a manner that the distance can be determined only inaccurately on the basis of the response time.

Illustrative embodiments provide a method for authenticating a radio key for a vehicle and a vehicle.

BRIEF DESCRIPTION OF THE DRAWINGS

Disclosed embodiments are described in detail below with reference to the figures.

DETAILED DESCRIPTION OF THE DISCLOSED EMBODIMENTS

Figure 1:
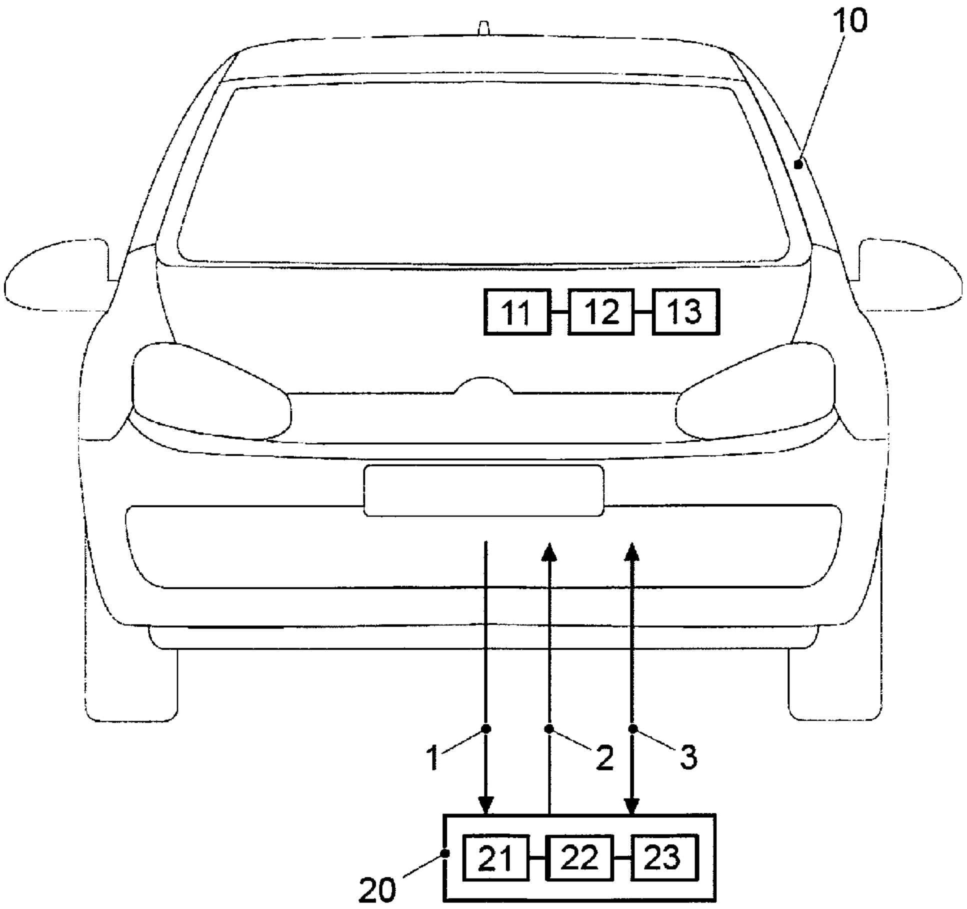
FIG. 1 schematically illustrates a vehicle having a radio key.

A method for authenticating a radio key for a vehicle is provided. This disclosed method comprises determining the distance between the radio key and the vehicle and authenticating the radio key.

When or while determining the distance, a character string generated by the radio key is transmitted to the vehicle. This character string is independent of an item of information which was possibly previously transmitted from the vehicle to the radio key. The authentication is carried out, in particular using a cryptographically secure method, on the basis of the character string transmitted from the radio key to the vehicle.

Since the character string which is transmitted from the radio key to the vehicle is generated independently of an item of information relating to the vehicle, this character string can be generated very quickly, with the result that the period of time between the transmission of a radio signal from the vehicle to the radio key and the reception of the radio signal sent back by the radio key is virtually not influenced by the generation of the character string. By virtue of the fact that the radio key is authenticated on the basis of the character string sent from the radio key to the vehicle, it is ensured that the same radio key as that from which the distance to the vehicle was also determined is authenticated.

In particular, the authentication of the radio key is considered to be successful only when the distance between the radio key and the vehicle, as determined by the vehicle, is below a predetermined distance threshold value.

Relay station attacks can be prevented by virtue of the authentication success being determined on the basis of the distance between the radio key and the vehicle.

The determination of the distance between the radio key and the vehicle comprises a propagation time measurement. This propagation time measurement is carried out using a first radio signal and a second radio signal. The first radio signal is transmitted from the vehicle to the radio key, whereas the second radio signal is transmitted from the radio key to the vehicle. Normally, the second radio signal is transmitted from the radio key to the vehicle as soon as the radio key has received the first radio signal from the vehicle. However, as a variant, it is also conceivable for the first radio signal to be transmitted from the vehicle only as soon as the second radio signal is received in the vehicle.

In this case, the second radio signal comprises the character string generated by the radio key.

The actual authentication of the radio key begins only after the two radio signals have been received.

The distance can already be determined before the authentication by virtue of the radio key being authenticated using a third radio signal only after the two radio signals have been received.

In addition, the first radio signal, which is transmitted from the vehicle to the radio key, may also comprise a further character string which is generated by the vehicle. In this case, the authentication (that is to say the generation of the third radio signal) cannot only be carried out on the basis of the first character string but also on the basis of the second character string.

The character string is generated by the radio key before receiving the first radio signal transmitted by the vehicle, with the result that the radio key does not lose any time through the generation of this character string. For example, the radio key may generate and store a respective character string to then transmit this character string with the second radio signal to the vehicle as soon as the radio key receives the first radio signal.

The character string transmitted from the radio key to the vehicle is a random character string, in particular.

A further method for authenticating a radio key for a vehicle is also provided. This further method comprises determining a distance between the radio key and the vehicle and authenticating the radio key.

In this case, a character string generated by the radio key is transmitted to the vehicle to determine the distance. This character string is generated using predetermined creation rules, for example, by means of a counter. The radio key is authenticated on the basis of the character string.

The embodiments described above which apply to the method are also possible for the further method.

A vehicle which comprises a transmitter, a receiver and control means is also provided within the scope of the present invention. The transmitter is configured to emit a first radio signal, whereas the receiver is configured to receive a second radio signal from a radio key, which signal comprises a character string. The control means are configured to measure a period of time between the emission of the first radio signal and the reception of the second radio signal to calculate a distance between the vehicle and the radio key on the basis of this period of time and to authenticate the radio key on the basis of the character string.

The disclosed vehicle provides the same benefits as the disclosed method which are stated in detail above, thus dispensing with a repetition here.

Since the determination of the distance and the actual authentication are decoupled in terms of time, the (slow) propagation time of the cryptographically secure authentication is irrelevant to the distance measurement. Since the cryptographically secure authentication is carried out using the character string transmitted when determining the distance, it is nevertheless ensured that the radio key which is authenticated is also the radio key for which the distance was previously determined.

Disclosed embodiments are suitable for motor vehicles, in particular. However, the scope is not restricted to motor vehicles since the disclosed embodiments can also be used in ships, aircraft and rail-bound or track-guided vehicles. Finally, the disclosed embodiments are conceivable for use in locking elements (for example, doors, windows) of stationary objects (for example, houses).

FIG. 1 illustrates a vehicle 10 and a radio key 20. The vehicle 10 comprises a radio transmitter 11 for transmitting a first radio signal 1 to the radio key 20, a controller 12 and a radio receiver 13 for receiving a second radio signal 2 which is transmitted by the radio key 20. The radio key 20 likewise comprises a radio transmitter 21 for transmitting the second radio signal 2 to the vehicle 10, a controller 22 and a radio receiver 23 for receiving the first radio signal 1 from the vehicle 10. The controller 12 of the vehicle 10 is able to determine a distance between the vehicle 10 and the radio key 20 on the basis of the propagation times of the two radio signals 1, 2. If this distance is below a predetermined distance threshold value, the vehicle 10 authenticates the radio key 20 with the aid of further radio communication 3.

Figure 2:
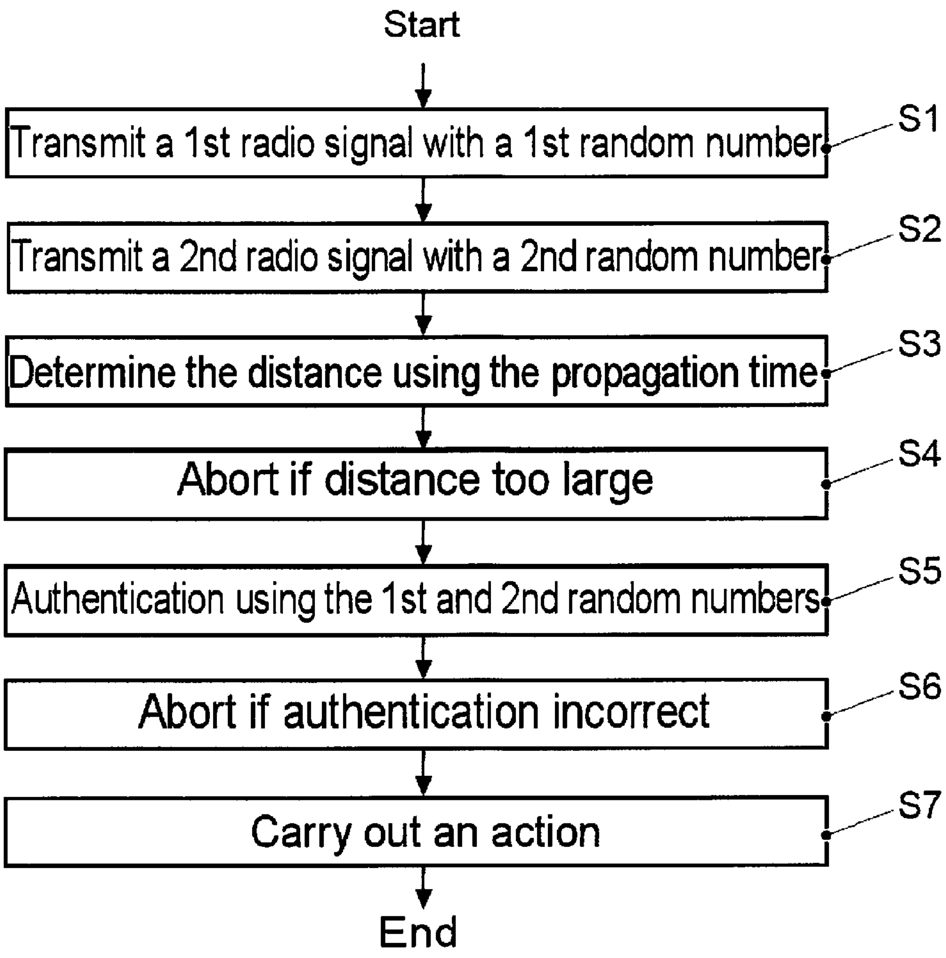
FIG. 2 depicts a flowchart of a method.

FIG. 2 illustrates, by way of example, the sequence of the method.

In the first step S1, the vehicle 10 transmits the first radio signal 1, which comprises a first random number, to the radio key 20 by broadcast. As soon as the radio key 20 has detected the first radio signal 1, the radio key 20 transmits the second radio signal 2, which comprises a second random number, to the vehicle 10. The radio key 20 generated and stored this second random number before receiving the first radio signal 1 to keep the period of time between the reception of the first radio signal 1 and the transmission of the second radio signal 2 as short as possible. In step S3, the distance between the vehicle 10 and the radio key 20 is determined in the vehicle 10 using the period of time which has elapsed between the transmission of the first radio signal 1 and the reception of the second radio signal 2. If the distance determined in step S3 is greater than a predetermined distance threshold value, the method aborts in step S4.

If the distance determined in step S3 is not greater than the predetermined distance threshold value, it is assumed that there is no relay station attack, with the result that the authentication of the radio key 20 is continued. For this purpose, an authentication is carried out in step S5 on the basis of the first and second random numbers using a cryptographic method. For example, the radio key uses a procedure (cryptographic method) which is also known to the vehicle to generate a code word on the basis of the first and second random numbers and transmits this code word to the vehicle 10 via radio communication 3. The vehicle 10 checks whether this code word corresponds to a code word which has been generated by the vehicle 10 itself using the procedure on the basis of the first and second random numbers. Since the code word of the radio key 2 is generated on the basis of the second random number which is transmitted from the radio key 20 to the vehicle 10 while determining the distance, the vehicle 10 can be certain that it also authenticates that vehicle key 20 for which it has determined the distance. The practice of generating the code word on the basis of the first random number as well is necessary so that both the vehicle 10 and the vehicle key 20 can precisely assign the distance determination to an authentication entity, since otherwise certain attack scenarios are conceivable.

If the code word generated by the vehicle does not match that code word which was transmitted during radio communication 3 from the vehicle key 20 to the vehicle 10, an abort is carried out in step S6 owing to incorrect authentication. Otherwise, a function of the vehicle 10, for which the radio key 20 is authorized, can be carried out in step S7.

DE 100 64 141 A1 relates to a method for verifying an authorization to lock or unlock or use a motor vehicle. In this case, a question/answer dialog is carried out between a code transmitter and a transmitting and receiving unit. The position of the code transmitter is determined and a control command is generated on the basis of this position if an answer signal proves to be authorized. A signal transmitted by the code transmitter may contain an item of time information from synchronized clocks to thereby carry out a propagation time measurement. The propagation time measurement can be used to determine the distance between the code transmitter and a proximity sensor.

WO 02/054353 A1 describes an identification system for verifying an authorization to access a motor vehicle. For this purpose, an inquiry signal is emitted in modulated form according to a sequence, whereupon a mobile code transmitter generates an answer signal by encrypting the received sequence and transmitting it back in modulated form. This answer signal is used to check the authorization of the code transmitter, which is also referred to as authentication.

DE 44 09 167 C1 relates to a remotely controllable, keyless access control device for a motor vehicle. In this case, a transceiver uses a distance detecting device to check whether the motor vehicle is in its immediate vicinity. To measure the distance, the distance detecting device can emit UHF signals or ultrasonic signals which are received, amplified and transmitted back by a control device.

DE 101 14 876 A1 relates to an identification system for verifying an authorization to access a motor vehicle. In this case, a code transmitter emits a coded answer signal as soon as it has previously received an inquiry signal. A time measurement of a question/answer dialog between the motor vehicle and the code transmitter is used to determine whether the code transmitter is in the vicinity of the motor vehicle.

DE 102 12 648 A1 describes an identification system for verifying an authorization to access a motor vehicle. For this purpose, a code transmitter receives an inquiry signal and in turn emits an answer signal which is received by the receiver in the vehicle. The distance between the code transmitter and the vehicle is determined by measuring the propagation time of the signals between the emission of the inquiry signal and the reception of the answer signal.

DE 10 2004 036 920 A1 discloses a locking system for a motor vehicle. In this case, signals are transmitted and received between a key and the motor vehicle. These signals are used to authenticate the key and to determine the distance between the key and the motor vehicle using the propagation time of one of the signals.

DE 101 58 200 and DE 101 58 202 A1 from the same applicant describe keyless usage authorization control in a motor vehicle. In this case, an identification is transmitted from the motor vehicle to a mobile transponder. The transponder codes this identification with a code key and transmits this identification which has been encrypted in this manner back to the vehicle. On the basis of the propagation time, the vehicle determines, on the one hand, a distance between the vehicle and the transponder and, on the other hand, authenticates the transponder using the encrypted identification.

DE 10 2007 004 063 A1 discloses keyless activation of a locking apparatus of a motor vehicle. In this case, a communication module emits a radio signal. As of a defined distance from the motor vehicle, the presence of the communication module is detected and an identification check is initiated.

LIST OF REFERENCE SYMBOLS

1 Radio signal
2 Radio signal
3 Radio communication for authentication
10 Vehicle
11 Transmitter
12 Controller
13 Receiver
20 Radio key
21 Transmitter
22 Controller
23 Receiver
S1-S7 Method step

The invention claimed is:

1. A method for authenticating a radio key for a vehicle, the method comprising:

determining a distance between the radio key and the vehicle; and authenticating the radio key;

generating a character string independent of any item of information in a first radio signal transmitted by the vehicle;

transmitting the character string generated by the radio key in a second radio signal to the vehicle to determine the distance between the radio key and the vehicle, wherein the authentication is carried out based on the character string, wherein the determination of the distance includes a propagation time measurement carried out by transmitting the first radio signal from the vehicle to the radio key, and transmitting the second radio signal transmitted from the radio key to the vehicle, wherein either the second radio signal is transmitted by the radio key as soon as the first radio signal is received by the radio key, or the first radio signal is transmitted by the vehicle as soon as the second radio signal is received by the vehicle, and wherein the authentication begins only after the first and second radio signals have been received.

2. The method of claim 1, wherein the authentication further comprises transmitting a third radio signal.

3. The method of claim 2, further comprising generating the third radio signal based on the first and second radio signals, and the third radio signal is transmitted from the radio key to the vehicle.

4. The method of claim 1, wherein the authentication is successful only if the determined distance is below a distance threshold value.

5. The method of claim 1, wherein the second radio signal comprises the character string.

6. The method of claim 1, further comprising generating a further character string by the vehicle, the first radio signal comprising the further character string, wherein the authentication is also carried out based on the further character string.

7. The method of claim 1, wherein the character string is generated before determining the distance to avoid losing time through the generation of the character string while determining the distance.

8. The method of claim 1, wherein the character string is a random character string.

9. A vehicle comprising:

a transmitter;

a receiver; and controller, wherein the transmitter emits a first radio signal, the receiver is configured to receive a second radio signal from a radio key, which second radio signal comprises a character string generated independent of the first radio signal, wherein the controller is configured to record a period of time between the emission of the first radio signal and the reception of the second radio signal to calculate a distance between the vehicle and the radio key based on the period of time and to authenticate the radio key based on the character string, wherein the vehicle is configured to determine the distance by a propagation time measurement, wherein the vehicle is configured to carry out the propagation time measurement based on a first radio signal being transmitted to the radio key by the transmitter and based on a second radio signal transmitted from the radio key and received by the receiver, wherein either the second radio signal is transmitted by the radio key as soon as the first radio signal is received by the radio key, or the first radio signal is transmitted by the vehicle as soon as the second radio signal is received by the vehicle, and wherein the vehicle is configured to begin the authentication only after the first and second radio signals have been received.

10. The vehicle of claim 9, wherein the authentication further comprises transmission of a third radio signal.

11. The vehicle of claim 10, wherein the third radio signal is generated based on the first and second radio signals, and the third radio signal is transmitted from the radio key to the vehicle.

12. The vehicle of claim 9, wherein the authentication is successful only if the determined distance is below a distance threshold value.

13. The vehicle of claim 9, wherein the second radio signal comprises the character string.

14. The vehicle of claim 9, wherein a further character string is generated by the vehicle and the first radio signal comprises the further character string, wherein the authentication is also carried out based on the further character string.

15. The vehicle of claim 9, wherein the character string is generated before determining the distance to avoid losing time through the generation of the character string while determining the distance.

16. The vehicle of claim 9, wherein the character string is a random character string.

* * * * *